(12) United States Patent
Weng et al.

(10) Patent No.: US 8,401,855 B2
(45) Date of Patent: Mar. 19, 2013

(54) SYSTEM AND METHOD FOR GENERATING DATA FOR COMPLEX STATISTICAL MODELING FOR USE IN DIALOG SYSTEMS

(75) Inventors: Fuliang Weng, Mountain View, CA (US); Zhe Feng, Shanghai (CN); Katrina Li, San Jose, CA (US)

(73) Assignee: Robert Bosch GNBH, Stuttgart (DE)

( * ) Notice: Subject to any disclaimer, the term of this patent is extended or adjusted under 35 U.S.C. 154(b) by 1078 days.

(21) Appl. No.: 12/367,131

(22) Filed: Feb. 6, 2009

(65) Prior Publication Data

US 2010/0204982 A1 Aug. 12, 2010

(51) Int. Cl.
*G10L 15/18* (2006.01)
(52) U.S. Cl. ........................................................ 704/257
(58) Field of Classification Search .................. 704/257, 704/270, 275
See application file for complete search history.

(56) References Cited

U.S. PATENT DOCUMENTS

| | | | |
|---|---|---|---|
| 4,763,277 A * | 8/1988 | Ashford et al. .................. 706/47 |
| 5,491,628 A * | 2/1996 | Wakayama et al. ................ 704/9 |
| 7,013,265 B2 * | 3/2006 | Huang et al. ....................... 704/9 |
| 7,197,460 B1 * | 3/2007 | Gupta et al. ................ 704/270.1 |
| 8,296,144 B2 * | 10/2012 | Weng et al. ..................... 704/270 |
| 2003/0120480 A1 * | 6/2003 | Mohri et al. ....................... 704/4 |
| 2004/0030557 A1 * | 2/2004 | Culy et al. .................. 704/270.1 |
| 2004/0176945 A1 * | 9/2004 | Inagaki et al. .................... 704/4 |
| 2006/0074631 A1 * | 4/2006 | Wang et al. ........................ 704/9 |
| 2009/0055184 A1 * | 2/2009 | Hebert ........................... 704/257 |

OTHER PUBLICATIONS

Weng, Fuliang et al., "Language Modelling for Multilingual Speech Translation" SLT Book Chapter, Dec. 15, 1999, pp. 281-296.

* cited by examiner

*Primary Examiner* — Abul Azad
(74) *Attorney, Agent, or Firm* — Dergosits & Noah LLP; Geoffrey T. Staniford

(57) ABSTRACT

Embodiments of a dialog system that utilizes grammar-based labeling scheme to generate labeled sentences for use in training statistical models. During the process of training data development, a grammar is constructed manually based on the application domain or adapted from a general grammar rule. An annotation schema is created accordingly based on the application requirements, such as syntactic and semantic information. Such information is then included in the grammar specification. After the labeled grammar is constructed, a generation algorithm is then used to generate sentences for training various statistical models.

17 Claims, 4 Drawing Sheets

SYSTEM AND METHOD FOR GENERATING DATA FOR COMPLEX STATISTICAL MODELING FOR USE IN DIALOG SYSTEMS

FIELD

Embodiments of the invention relate generally to dialog systems, and more specifically to generating labeled sentences for training statistical models.

BACKGROUND

Spoken language is the most natural and convenient communication tool for people. With data storage capacities increasing rapidly, people tend to store greater amounts of information in databases. Accessing this data with spoken language interfaces offers people convenience and efficiency, but only if the spoken language interface is reliable. This is especially important for applications in eye-busy and hand-busy situations, such as driving a car. Man-machine interfaces that utilize spoken commands and voice recognition are generally based on dialog systems. A dialog system is a computer system that is designed to converse with a human using a coherent structure and text, speech, graphics, or other modes of communication on both the input and output channel. Dialog systems that employ speech are referred to as spoken dialog systems and generally represent the most natural type of machine-man interface. With the ever-greater reliance on electronic devices, spoken dialog systems are increasingly being implemented in many different machines.

Speech recognition processes involve the conversion of spoken acoustic signals into words or sets of words. Digitized speech signals are transformed into sets of useful measurements or features at a fixed rate. These features are then used to search from most likely word candidates through the use of constraints imposed by acoustic, lexical, and language models. At the acoustic phonetic level, speaker variability is usually modeled using statistical techniques applied to large amounts of data. Automatic speech recognition (ASR) algorithms generally use statistical and structural pattern recognition techniques and/or knowledge based (phonetic and linguistic) principles. ASR systems can be based on methods in which entire words or sentences (segments) are directly recognized, or in which an intermediate phonetic labeling method is used before a lexical search.

Speech recognition systems make extensive use of training data to build a database of recognized words. The data in this application typically refers to text data. In many dialog applications, statistical models must be trained for different modules in the dialog system. In order to train a proper statistical model, a large amount of labeled training data is often needed. Training data is labeled in terms of certain syntactic and/or semantic information. Obtaining a sufficiently large amount of labeled training data is time-consuming, labor-intensive, and costly. Present known labeling methods typically involve manually labeling each and all sentences in a data set. For large data sets, this can involve a great deal of cost and effort.

What is needed, therefore, is a training data labeling system that is efficient and cost-effective.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a dialog system that utilizes grammar-based labeling scheme to generate labeled sentences for use in training statistical models. During the process of training data development, a grammar is constructed manually based on the application domain or adapted from a general grammar rule. An annotation schema is created accordingly based on the application requirements, such as syntactic and semantic information. Such information is then included in the grammar specification. After the labeled grammar is constructed, a generation algorithm is then used to generate sentences for training various statistical models.

In the following description, numerous specific details are introduced to provide a thorough understanding of, and enabling description for, embodiments of the labeled sentence generation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
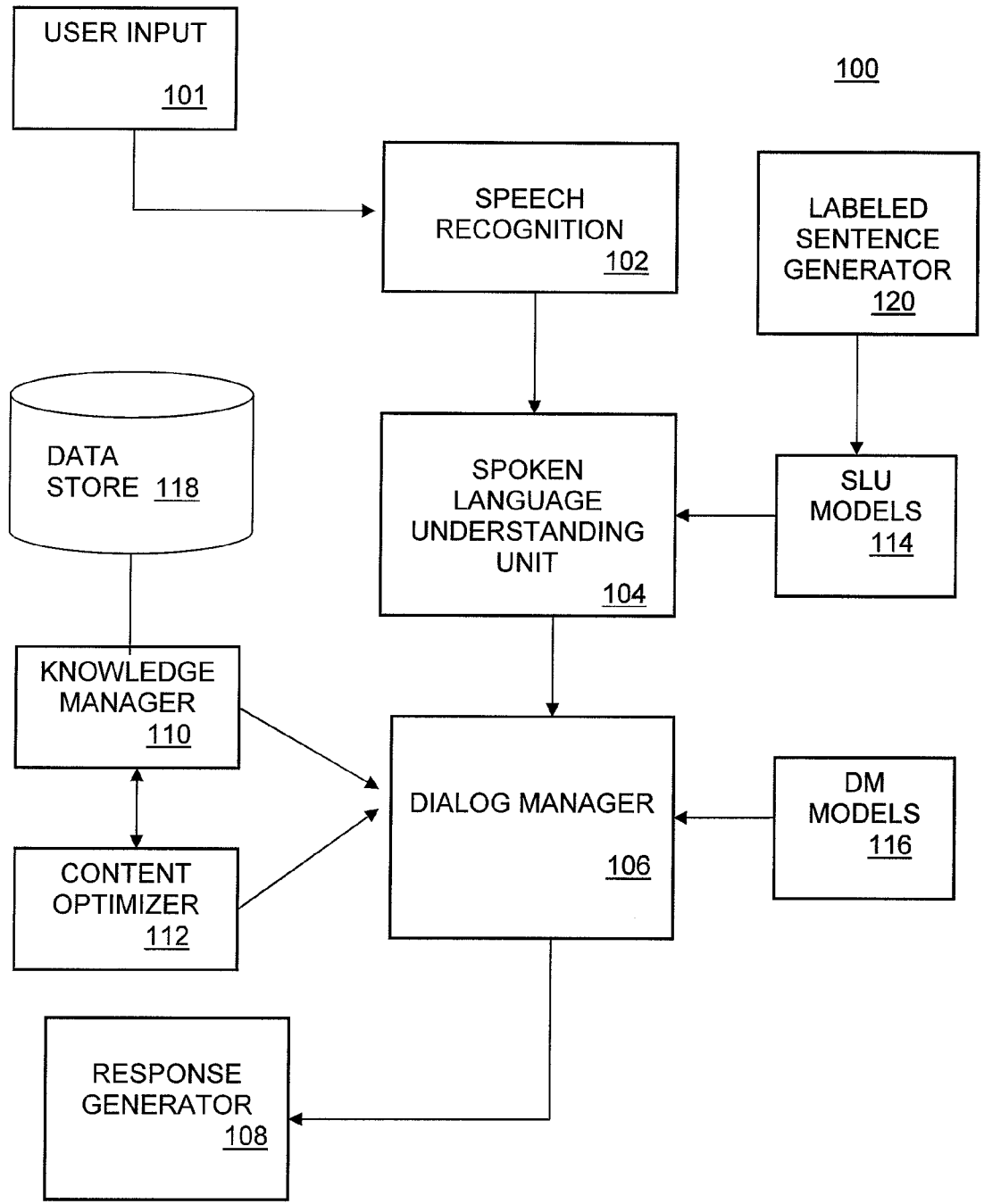
FIG. 1 is a block diagram of a spoken dialog system that incorporates a grammar generation system for complicated statistical modeling, according to an embodiment.

FIG. 1 is a block diagram of a spoken dialog system that incorporates a labeled grammar and sentence generation system for complicated statistical modeling, according to an embodiment. For purposes of the present description, any of the processes executed on a processing device may also be referred to as modules or components, and may be standalone programs executed locally on a respective device computer, or they can be portions of a distributed client application run on one or more devices. The core components of system 100 include a spoken language understanding (SLU) module 104 with multiple understanding strategies for imperfect input, an information-state-update or other kind of dialog manager (DM) 106 that handles multiple dialog threads and mixed initiatives, a knowledge manager (KM) 110 that controls access to ontology-based domain knowledge, and a content optimizer 112 that connects the dialog manager and the knowledge manager for resolving ambiguities from the users' requests, regulating the amount of information to be presented to the user, as well as providing recommendations to users. In one embodiment, spoken user input 101 produces acoustic waves that are received by a speech recognition unit 102. The speech recognition unit 102 can include components to provide functions, such as dynamic grammars and class-based n-grams. In general, n-gram models are a type of probabilistic model for predicting the next item in a sequence, and an n-gram is a sub-sequence of n items from a given sequence. In the speech recognition system, these items can be phonemes, syllables, letters, words or base pairs, according to the application.

In the case where the user input 101 is text-based rather than voice-based, the speech recognition unit 102 is bypassed, and simulated user input is provided directly to the spoken language understanding unit 104. A response generator 108 provides the output of the system 100. The response generator 108 generates audio and/or text output based on the user input. Such output can be an answer to a query, a request for clarification or further information, reiteration of the user input, or any other appropriate response. The response generator 108 utilizes domain information when generating responses. Thus, different wordings of saying the same thing to the user will often yield very different results. System 100 illustrated in FIG. 1 includes a large data store 118 that stores certain data used by one or more modules of system 100.

The embodiment of system 100 also includes one or more models that are used by components of system 100. For the embodiment of FIG. 1, models are provided for the SLU 104 and the dialog manager 106 components. These models are trained for their respective component to provide a body of data that can be used by the component. During the process of training data development, a grammar is constructed manually based on the application domain or adapted from a general grammar rule. An annotation schema is created accordingly based on the application requirements, such as syntactic and semantic information. This information is then included in the grammar specification. As shown in FIG. 1, a labeled sentence generator process is used to generate the models 114 for the SLU 104.

Figure 2:
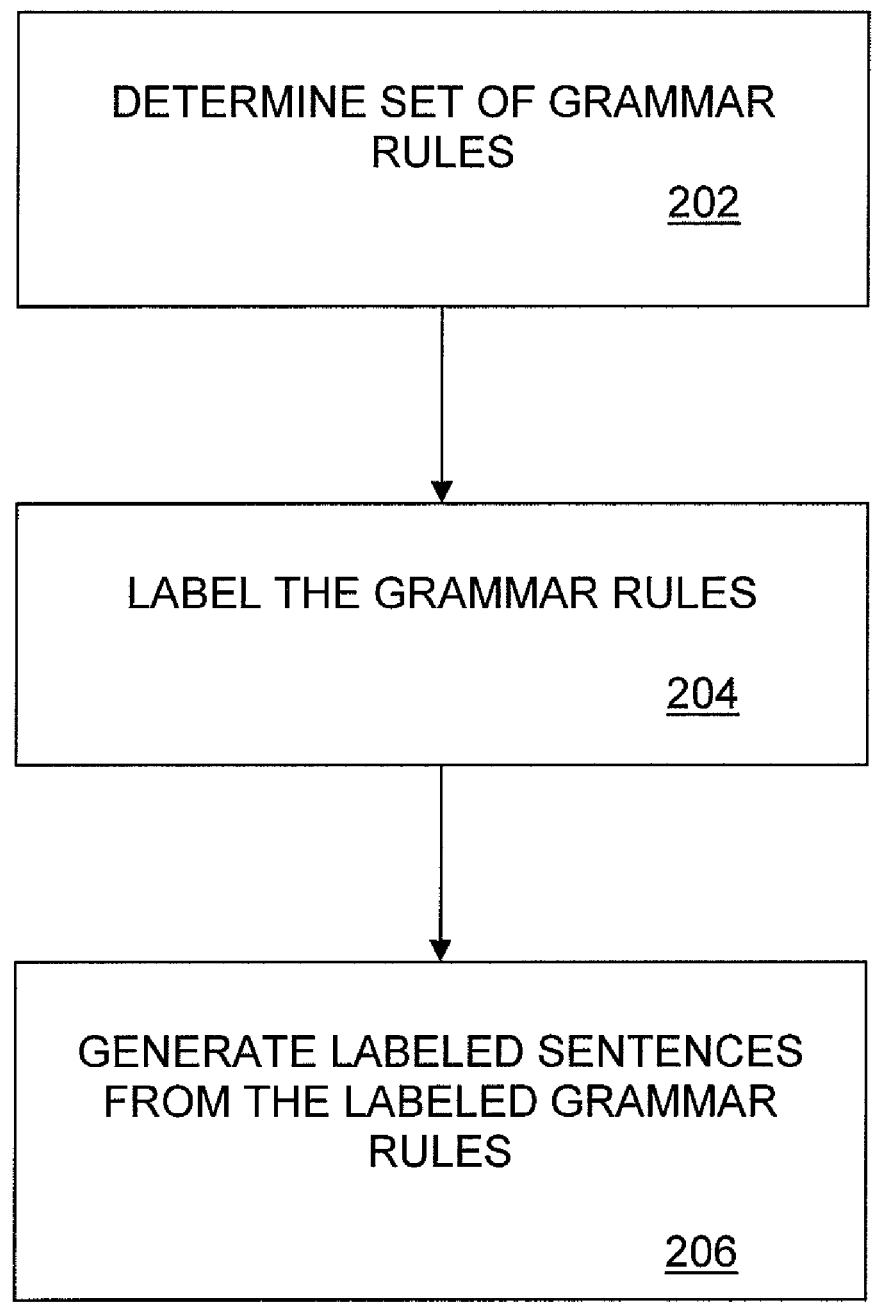
FIG. 2 is a flowchart illustrating a method of generating labeled sentences, under an embodiment.

FIG. 2 is a flowchart illustrating a method of generating labeled sentences, under an embodiment. In block 202, a set of grammar rules is determined. In general, a grammar is a set of rules that define the structural relationships in language and that provide a mechanism for generating all sentences possible in that language. A context-free grammar, G, is a 4-tuple (quadruple) of the form G{V, T, R, S}, where V is a finite set of non-terminal characters or variables representing different types of phrases in the sentence, T is a finite set of terminals that comprise the actual content of the sentence, R is a finite set of rules or productions of the grammar, and S is the start variable that represents the whole sentence.

The number of grammar rules generally depends upon the actual application that is being used. Different grammar rules can be defined for various objects within the application. For example, a particular grammar rule may dictate the formatting of dates, another may dictate the formatting of money, another may dictate the formatting of city names, and so on.

An example of a context-free grammar is:

S←NP VP

Where S is the start variable and is used to represent an entire sentence. In this case, the sentence comprises a noun phrase (NP) and a verb phrase (VP). This grammar above is an unlabeled grammar, and any number of grammar rules may be defined for a particular application. For example, a grammar set of the form G={V, T, R, S} may have the non-terminal elements of a noun phrase, a verb phrase, an article, a noun, a verb, an adjective phrase, an adjective, and an adverb, that is, NT={S, NP, VP, DD, NN, VB, ADJP, ADV, ADJ}, and the terminal elements, such as TS={table, plate, spoon, the, a, sit, eat, clean, very}. As a note, a subset of NT consisting of DD, NN, VB, ADV, and ADJ, sometimes, are also called preterminals. In this case, a simple example of a set of grammar rules, R, may be as follows:

S→NP VP
NP→NP NP
NP→DD ADJP NN
DD→the/a
NN→table/plate/spoon
VP→VB NP
VB→sit/eat
ADJP→ADV ADJ
ADJ→clean
ADV→very Under conventional grammar processing techniques, the processing starts with the start symbol "S" and executes all rules associated with S through the non-terminal elements, V, until the terminal elements, T, are reached to generate the sentences.

In block 204 of FIG. 2, the grammar rules are labeled. The grammar rules can be labeled with multiple levels of information, depending on application and the model or models that are used for a specific module in system 100. In one embodiment, the labels may specify a syntactic or semantic characteristic of the grammar rule. An example of a labeled grammar rule is as follows:

S←NP_sbj VP

In this case, the first noun phrase is labeled as a subject and the second verb phrase is not labeled at this level. The act of labeling generally comprises the annotation of the grammar rule with the particular item of information regarding each element of the rule. In one embodiment, the information consists of semantic and/or syntactic information, such as part of speech, lexical information, and so on.

After the labeled grammar is constructed, a sentence generation algorithm is then used to generate sentences. The sentence generation process takes the labeled grammar rules and generates sentences from the grammar. The label annotations from the labeled grammar rules are automatically associated with the generated sentences, thus the labeled rules are used to generate labeled sentences. This eliminates the need to label any of the sentences after they have been generated. An example of a labeled sentence is as follows:

"I want to go to New York" (original sentence)

I_PRN_sbj Want_VB_pred To_TO_pred Go_VB_pred To_IN_dir New York_NNP_city (labeled sentence)

In the above example, the original sentence "I want to go to New York" has a number of elements (words). Each of the words is then labeled with a defined syntactic information label. For example, the word "I" is labeled as a pronoun and further labeled as a subject of the sentence, the word "want" is labeled as a verb and further labeled as a predicate of the sentence, and so on. The number and type of labels for each word of a sentence depends on the requirements of the application. Thus, each word or element of a labeled sentence may be annotated with any number of practical levels of information. For example, the word "New York" may be labeled as a geographic entity, a place name (NNP) and a city, as follows: "New York_NNP_city." The labeled sentences are generated by labeled rules that are likewise labeled with the same annotations. Thus the labeled grammar rule that generated the labeled word would have the same labels, such as NP_NNP_city.

Figure 3:
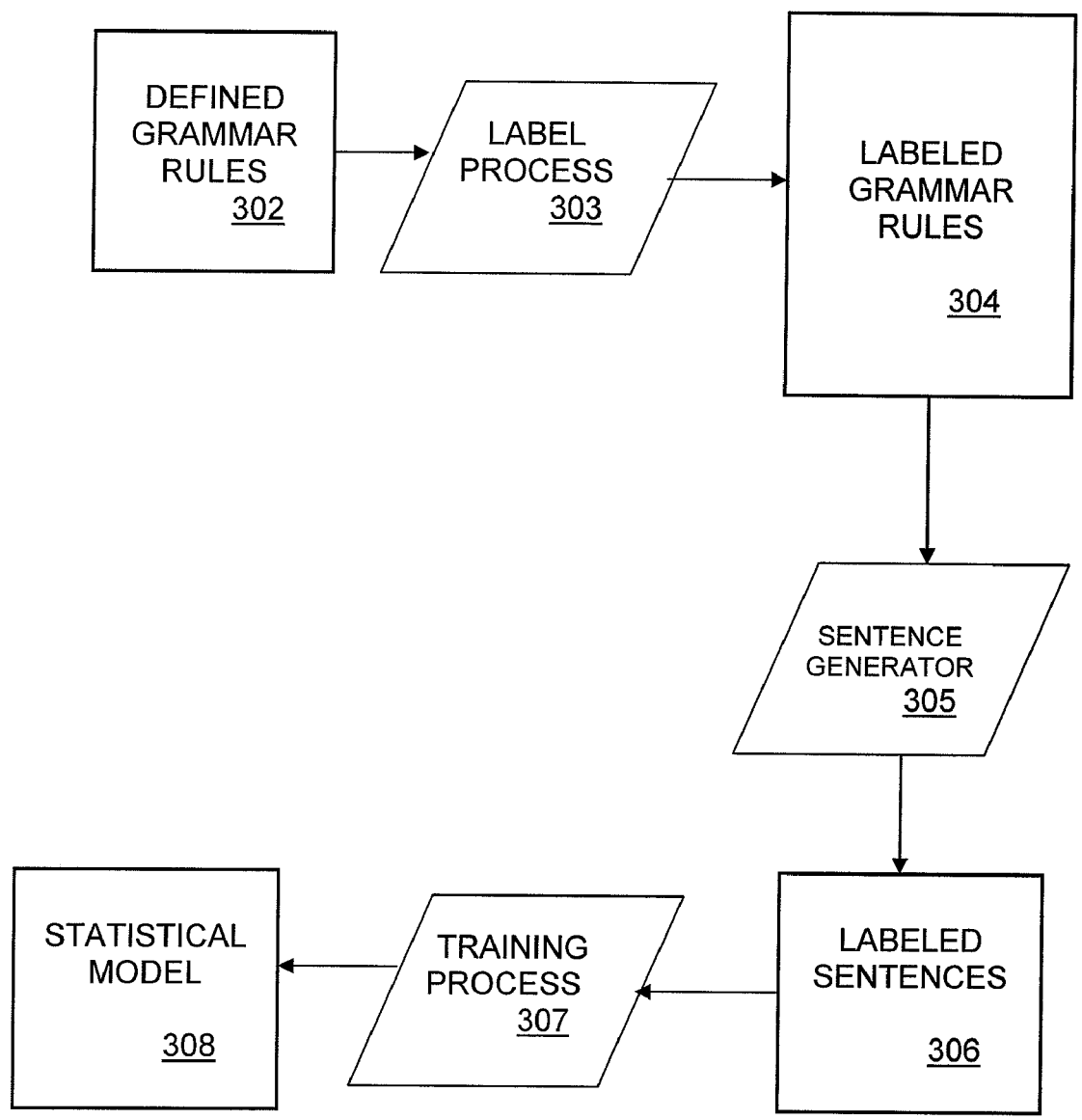
FIG. 3 is a flow diagram illustrating the components and processes for generating labeled sentences for training statistical models, under an embodiment.

FIG. 3 is a flow diagram illustrating the components and processes for generating labeled sentences for training statistical models, under an embodiment. As shown in FIG. 3, a defined set of grammar rules 302 are provided to a labeling process 303. In typical implementations, the grammar rules are manually labeled with respect to one or more defined characteristics, such as semantic/syntactic properties. Alternatively, the labeling process may be automated and performed through a programmatic process that is configured to recognize elements of the rules and attach appropriate labels to each rule element.

The label process 303 generates a set of labeled grammar rules 304 that comprise each of the defined grammar rules annotated with the appropriate labels. The grammar rules are then utilized by a sentence generator process 305 to generate labeled sentences 306. The labeled sentences 306 can then be used by a training process 307 to train one or more statistical models 308.

The label process 303 can associate labels used for different purposes with the grammar rules for use with one or more modules of the dialog system 100. For example, the model 116 for a dialog manager 106 may be used to determine whether the user input is a command, request, or plain statement; whereas the model 114 for the SLU 104 may be used to determine whether the input element is a noun subject or action.

Figure 4:
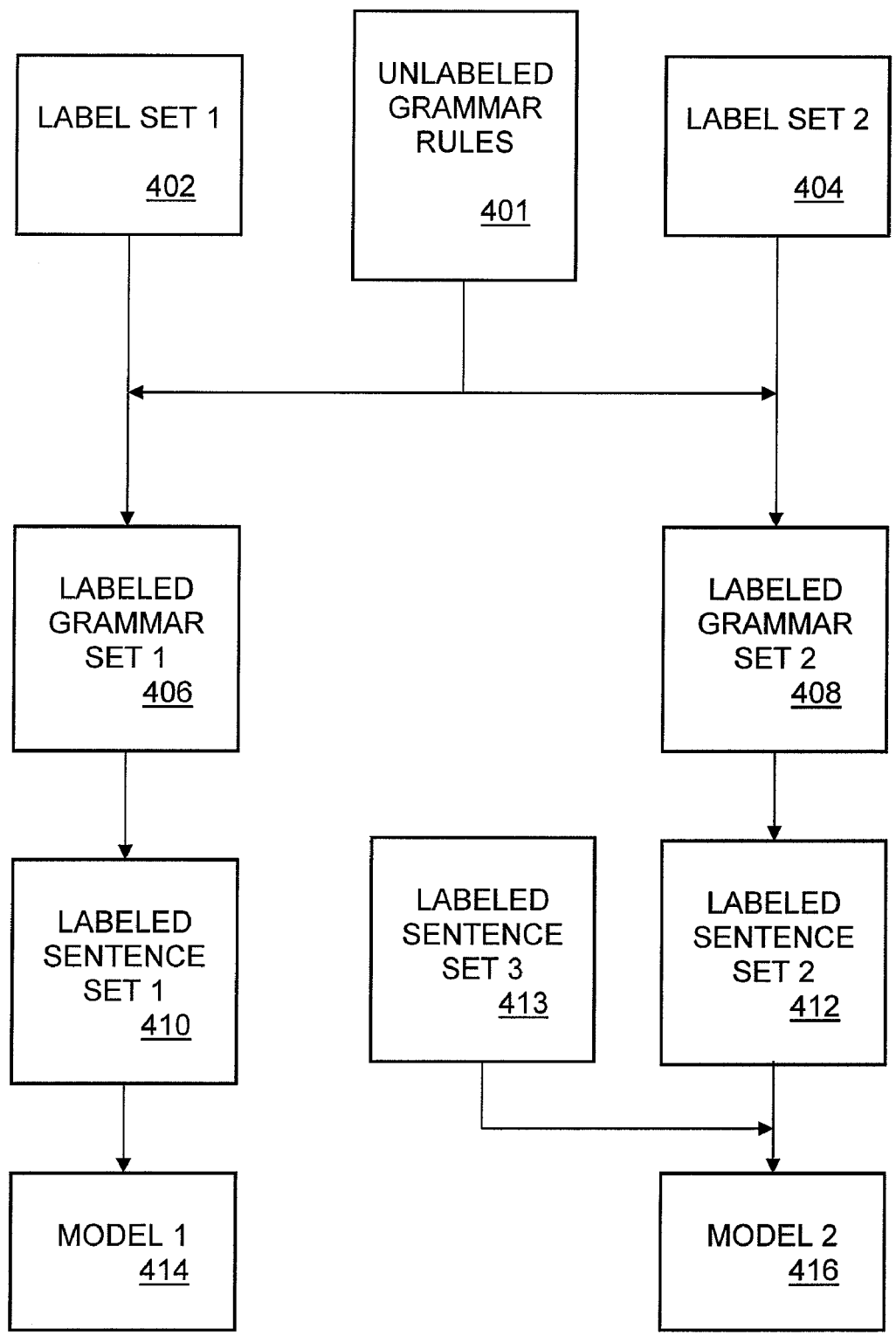
FIG. 4 is a block diagram of an example modeling scheme using labeled sentences, under an embodiment.

In one embodiment, a single set of grammar rules may be defined for an application, and different labels applied for different modules within the system. These labels then generate different sets of labeled sentences for training different models used by these modules. FIG. 4 is a block diagram of an example modeling scheme using labeled sentences, under an embodiment. As shown in FIG. 4, a common set of unlabeled grammar rules 401 is defined. Different label sets 402 and 404 are then defined for particular applications and/or modules within the system. Label set 1 applied to grammar rules 401 generate labeled grammar set 406, and label set 2 applied to grammar rules 401 generate labeled grammar set 408. The labeled grammar sets are then used to generate respective labeled sentence sets. Thus, the first labeled grammar set 406 generates labeled sentence set 1, 410, and the second labeled grammar set 408 generates labeled sentence set 2, 412. These labeled sentence sets, either alone or in conjunction with additional labeled sentence sets (e.g., labeled sentence set 3, 413) are used to train respective models 414 and 416.

Embodiments provide significant advantages and efficiencies over present methods of providing labeled data for use in statistical modeling. Instead of manually labeling each and every sentence in a data set, the labeled grammar generating process labels grammar rules and then generates labeled sentences using these labeled grammar rules. For large data sets, this can greatly reduce the cost and effort involved in generating sentences for training various statistical models.

Aspects of the labeled sentence generation process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the labeled sentence generation process is not intended to be exhaustive or to limit the embodiments to the precise form or instructions disclosed. While specific embodiments of, and examples for, processes in computing devices are described herein for illustrative purposes, various equivalent modifications are possible within the scope of the disclosed methods and structures, as those skilled in the relevant art will recognize. The elements and acts of the various embodiments described above can be combined to provide further embodiments. These and other changes can be made to the response generation process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A computer-implemented method in a dialog system, comprising:
   defining a set of one or more grammar rules defined for various objects within an application executed by the dialog system;
   labeling each grammar rule of the set of grammar rules with semantic or syntactic characteristics by annotating each grammar rule with a specific item of information regarding each element of the respective grammar rule to produce labeled grammar rules;
   generating labeled sentences from the set of labeled grammar rules to preclude the need to label sentences after they are generated; and using the labeled sentences to train one or more statistical models to be used by a spoken language unit of the dialog system.

2. The method of claim 1 wherein each grammar rule of the set of grammar rules comprises a context-free grammar rule.

3. The method of claim 2 wherein each context-free grammar rule is a 4-tuple that consists of a start point, a non-terminal element, a terminal element, and a rule.

4. The method of claim 1 wherein the labeled sentences each comprise a plurality of words, wherein each word of the plurality of words is annotated with one or more characteristics.

5. The method of claim 4 wherein each characteristic of one or more characteristic represents at least one of the semantic or syntactic characteristics.

6. The method of claim 5 wherein one or more models are used by a speech recognition stage of the dialog system.

7. The method of claim 5 wherein the one or more models are utilized by a dialog manager unit of the dialog system.

8. A dialog system, comprising:
   a speech recognition unit receiving a user utterance including one or more sentences;
   a spoken language understanding unit receiving the user utterance, and utilizing one or more models to derive a hypothesis for each word of the one or more sentences;
   a labeled sentence generator labeling each grammar rule of a set of grammar rules defined for various objects within an application executed by the dialog system with semantic or syntactic characteristics by annotating each grammar rule with a specific item of information regarding each element of the respective grammar rule to produce labeled grammar rules to preclude the need to label sentences after they are generated, and generating labeled sentences from the set of labeled grammar rules; and
   a training component using the labeled sentences to train one or more statistical models to be used by one of the speech recognition unit and the spoken language understanding unit.

9. The system of claim 8 wherein each grammar rule of the set of grammar rules comprises a context-free grammar rule.

10. The system of claim 9 wherein each context-free grammar rule is a 4-tuple that consists of a start point, a non-terminal element, a terminal element, and a rule.

11. The system of claim 8 wherein the input source comprises a user utterance input to a speech recognition stage of the dialog system.

12. The method of claim 11 wherein the one or more models are utilized by a dialog manager unit of the dialog system.

13. A non-volatile computer readable medium containing a plurality of program instructions, which when executed by a processor, cause the processor to perform the steps of:
   processing the rules of a defined set of grammar rules for various objects within an application executed by the dialog system;
   labeling each grammar rule of the set of grammar rules with semantic or syntactic characteristics by annotating each grammar rule with a specific item of information regarding each element of the respective grammar rule to produce labeled grammar rules;
   generating labeled sentences from the set of labeled grammar rules to preclude the need to label sentences after they are generated; and
   using the labeled sentences to train one or more statistical models to be used by a spoken language unit of the dialog system.

14. The medium of claim 13 wherein each grammar rule of the set of grammar rules comprises a context-free grammar rule.

15. The medium of claim 14 wherein each context-free rule is a 4-tuple that consists of a start point, a non-terminal element, a terminal element, and a rule.

16. The medium of claim 15 wherein the labeled sentences each comprise of a plurality of words, wherein each word of the plurality of words is annotated with one or more characteristics.

17. The medium of claim 16 wherein each characteristic of one or more characteristic represents at least one of the semantic or syntactic characteristics.

* * * * *